(12) United States Patent
Shitrit

(10) Patent No.: US 10,974,328 B2
(45) Date of Patent: Apr. 13, 2021

(54) INDEXABLE DRILLING INSERT HAVING THREE TIP PORTIONS AND ROTARY CUTTING TOOL HAVING SUCH DRILLING INSERT CENTRALLY MOUNTED

(71) Applicant: Iscar, Ltd., Tefen (IL)

(72) Inventor: Shim'on Shitrit, Kibbutz Metsuba (IL)

(73) Assignee: Iscar, Ltd., Tefen (IL)

(*) Notice: Subject to any disclaimer, the term of this patent is extended or adjusted under 35 U.S.C. 154(b) by 0 days.

(21) Appl. No.: 16/451,127

(22) Filed: Jun. 25, 2019

(65) Prior Publication Data

US 2020/0406374 A1    Dec. 31, 2020

(51) Int. Cl.
*B23B 51/04*    (2006.01)

(52) U.S. Cl.
CPC ...... *B23B 51/048* (2013.01); *B23B 2251/085* (2013.01); *B23B 2251/18* (2013.01); *B23B 2251/50* (2013.01)

(58) Field of Classification Search
CPC ......... Y10T 407/22–24; Y10T 407/235; Y10T 407/245; Y10T 408/90993; B23C 5/109; B23C 5/20; B23C 2200/086; B23C 5/207; B23C 2210/168; B23B 51/048; B23B 2200/0419; B23B 2200/08; B23B 2251/50; B23B 2251/18; B23B 2251/085
See application file for complete search history.

(56) References Cited

U.S. PATENT DOCUMENTS

| | | | |
|---|---|---|---|
| 5,354,156 A | 10/1994 | Von Haas et al. | |
| 5,688,083 A * | 11/1997 | Boianjiu | B23B 51/048 408/224 |
| 7,108,460 B2 * | 9/2006 | Chang | B23B 27/145 408/223 |
| 8,177,460 B2 * | 5/2012 | Satran | B23C 5/2213 407/113 |
| 8,702,357 B2 | 4/2014 | Fang et al. | |

(Continued)

FOREIGN PATENT DOCUMENTS

EP           2532461       12/2012
WO    WO-2014034056 A1 *  3/2014    ............... B23C 5/06

OTHER PUBLICATIONS

Machine Translation, WO 2014/034056 A1, Kinukawa et al., Mar. 6, 2014. (Year: 2014).*

(Continued)

*Primary Examiner* — Chwen-Wei Su
(74) *Attorney, Agent, or Firm* — Womble Bond Dickinson (US) LLP

(57) ABSTRACT

A drilling insert has a central portion with a central axis, and three circumferentially spaced tip portions. Each tip portion has a first axis and two diverging first cutting edges with radially outermost cutting points defining a first circle lying on a tip plane perpendicular to the first axis and having a first cutting diameter. In a view along one of the first axes, a second circle having a second diameter circumscribes the drilling insert, and the first cutting diameter is at least sixty percent of the second diameter. A cutting tool rotatable about a tool axis with a tool cutting diameter includes the drilling insert, and a second cutting insert having a second cutting edge. One of the tip portions is operative having its first axis coaxial to the tool axis, and the second cutting edge extends radially outward of the first cutting diameter.

25 Claims, 6 Drawing Sheets

(56) References Cited

U.S. PATENT DOCUMENTS

| | | | |
|---|---|---|---|
| 9,108,252 B2* | 8/2015 | Reiner | B23B 51/048 |
| 9,421,622 B2 | 8/2016 | Segev et al. | |
| 2008/0304925 A1 | 12/2008 | Meyer et al. | |
| 2018/0001400 A1* | 1/2018 | Men | B23C 5/06 |
| 2020/0238397 A1 | 7/2020 | No | |

OTHER PUBLICATIONS

International Search Report dated Oct. 12, 2020, issued in PCT counterpart application (No. PCT/IL2020/050628).
Written Opinion dated Oct. 12, 2020, issued in PCT counterpart application (No. PCT/IL2020/050628).

* cited by examiner

INDEXABLE DRILLING INSERT HAVING THREE TIP PORTIONS AND ROTARY CUTTING TOOL HAVING SUCH DRILLING INSERT CENTRALLY MOUNTED

FIELD OF THE INVENTION

The present invention relates to an indexable cutting insert having three tip portions and a rotary cutting tool having such cutting insert centrally mounted, for use in metal cutting processes in general, and for drilling operations in particular.

BACKGROUND OF THE INVENTION

Within the field of cutting tools used in drilling operations, there are many examples of indexable cutting inserts used in drilling operations, and some examples of drilling tools having centrally mounted indexable cutting inserts.

U.S. Pat. No. 8,702,357 discloses a multi-piece spade drill head for a spade drill, the spade drill comprising a body portion and a drill head removably secured to the body portion, the multi-piece spade drill head comprising: a center insert piece forming a central region of the spade drill head, the center insert piece including first and second sides and a cutting edge; a first side insert piece forming at least a portion of a first side region of the spade drill head, the first side insert piece comprising a cutting edge and a mating surface configured to mate with at least a region of the first side of the center insert piece; and a second side insert piece forming at least a portion of a second side region of the spade drill head, the second side insert piece comprising a cutting edge and a mating surface configured to mate with at least a region of the second side of the center insert piece; wherein the center insert piece, the first side insert piece, and the second side insert piece are configured to be individually removably secured to the body portion with the mating surface of the first side insert piece mated to the first side of the center insert piece and the mating surface of the second side insert piece mated to the second side of the center insert piece with endpoints of cutting edges of the insert pieces aligned to abut and form straight, continuous cutting edge regions on an end of the spade drill; wherein at least one of the center insert piece, the first side insert piece, and the second side insert piece includes two cutting edges and is indexable and securable to the body portion in at least two alternate cutting orientations.

U.S. Pat. No. 9,421,622 discloses a central drill insert having a bottom surface, a top surface, and a peripheral surface extending therebetween. At least three lead drill portions protrude outwards from the peripheral surface, each having a drill axis and a plurality of drill cutting edges. A secondary cutting edge is adjacent each lead drill portion, extending along the intersection of the top surface and the peripheral surface, transversely to the respective drill axis. Each secondary cutting edge is spaced apart from the associated drill cutting edges along the drill axis. A dovetail abutment flank is formed on the peripheral surface along the intersection of the top surface and the peripheral surface, extending from each one of the lead drill portions towards the secondary cutting edge associated with another lead drill portion. A cutting tool has an insert pocket for retaining the central drill insert with the operative drill axis aligned with the tool axis.

It is an object of the present invention to provide an improved indexable drilling insert having three tip portions.

It is also an object of the present invention to provide an improved indexable drilling insert having a high cutting extent relative its size/volume.

It is also a further object of the present invention to provide an improved rotary cutting tool in which the said indexable drilling insert is removably securable in a stable manner.

It is yet a further object of the present invention to provide an improved rotary cutting tool in which the non-operative cutting edges of the said indexable drilling insert are well protected.

SUMMARY OF THE INVENTION

In accordance with the present invention, there is provided an indexable drilling insert comprising:
  a central portion and three tip portions,
    the central portion having opposing first and second side surfaces and a central axis passing through the first and second side surfaces,
    a median plane perpendicular to the central axis, and passing in-between the two side surfaces;
    the three tip portions circumferentially spaced about the central portion,
    each tip portion having:
      a first axis and two diverging first cutting edges,
      the first axis intersecting the tip portion at a tip point,
      the two first cutting edges extending away from the first axis to two radially outermost cutting points with respect to the first axis,
      a tip plane perpendicular to the first axis and containing the two radially outermost cutting points, and
      the two radially outermost cutting points lying on an imaginary first circle having a center coincident with the first axis, and a first cutting diameter,
    wherein:
    the median plane contains the three first axes,
    in a view taken along any one of the three first axes, an imaginary second circle having a second diameter circumscribes the drilling insert, and
    the first cutting diameter is at least sixty percent of the second diameter.

Also, in accordance with the present invention, there is provided a rotary cutting tool rotatable about a tool axis in a direction of rotation and having a tool cutting diameter, comprising:
  a tool shank extending along the tool axis and having a plurality of insert receiving pockets at forward end thereof, and
  a plurality of cutting inserts removably secured in the plurality of insert receiving pockets, including:
    a drilling insert as described above, and
    a second cutting insert differing in construction from the drilling insert,
    the second cutting insert having at least one second cutting edge,
  wherein:
  one of the tip portions of the drilling insert is operative, and has its first axis coaxial to the tool axis, and
  one of the second cutting edges of the second cutting insert is operative and extends radially outward of the first cutting diameter, relative to the tool axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
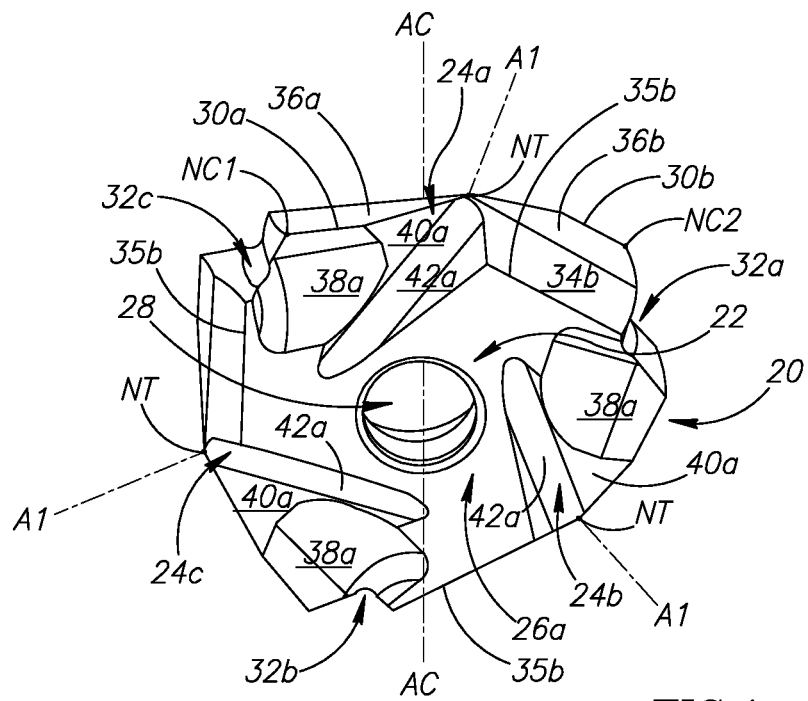
FIG. 1 is a perspective view of a first cutting insert in accordance with the present invention.
Figure 2:
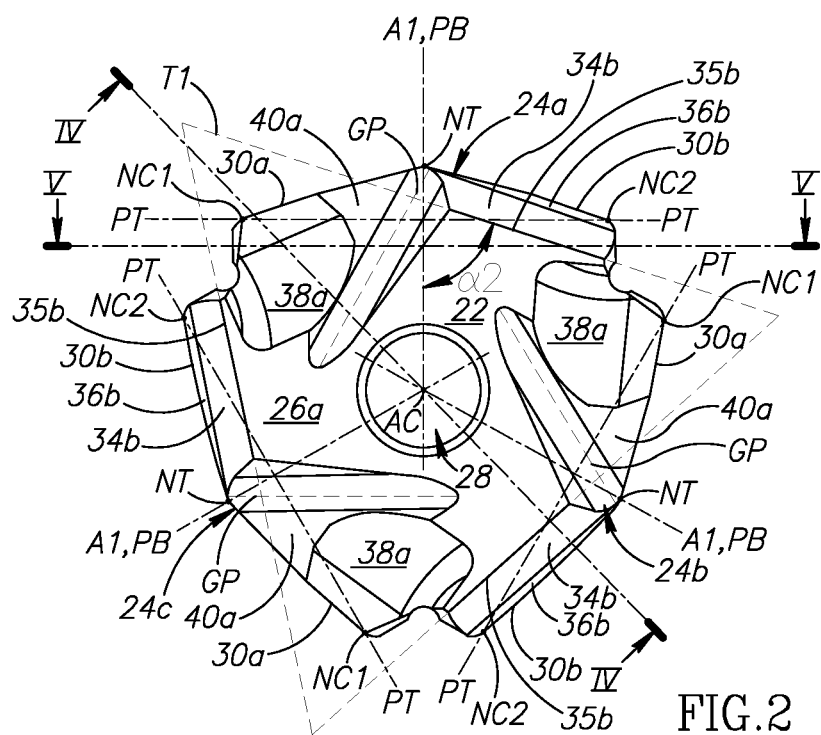
FIG. 2 is a side view along a central axis of the first cutting insert shown in FIG. 1.
Figure 3:
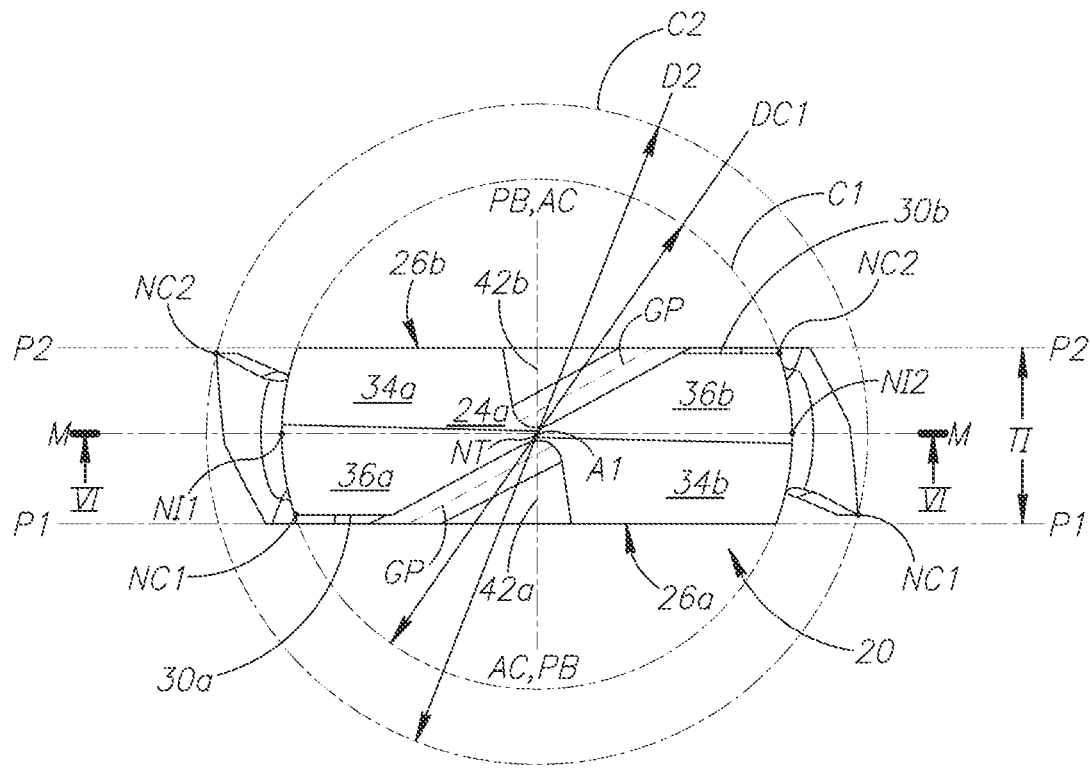
FIG. 3 is a peripheral view along a first axis of the first cutting insert shown in FIG. 1.

As shown in FIGS. 1 to 3, one aspect of the present invention relates to an indexable first cutting insert 20 having a central portion 22 and three tip portions 24a, 24b, 24c.

In some embodiments of the present invention, the first cutting insert 20 may be a drilling insert.

Also, in some embodiments of the present invention, the first cutting insert 20 may be manufactured by form pressing and sintering a cemented carbide, such as tungsten carbide, and may be coated or uncoated.

As shown in FIGS. 1 to 3, the central portion 22 has opposing first and second side surfaces 26a, 26b and a central axis AC passing through the first and second side surfaces 26a, 26b.

In some embodiments of the present invention, the first cutting insert 20 may be indexable about the central axis AC.

Also, in some embodiments of the present invention, the first cutting insert 20 may exhibit 3-fold rotational symmetry about the central axis AC.

Further, in some embodiments of the present invention, the first and second side surfaces 26a, 26b may be identical.

As shown in FIGS. 1 and 2, a through bore 28 may intersect the first and second side surfaces 26a, 26b.

In some embodiments of the present invention, the through bore 28 may be coaxial to the central axis AC.

As shown in FIGS. 1 to 3, the three tip portions 24a, 24b, 24c are circumferentially spaced about the central portion 22.

Each tip portion 24a, 24b, 24c has a first axis A1 and two diverging first cutting edges 30a, 30b, the two first cutting edges 30a, 30b extending away from the first axis A1 to two radially outermost cutting points NC1, NC2 with respect to the first axis A1.

In some embodiments of the present invention, each first axis A1 may intersect the central axis AC.

Also, in some embodiments of the present invention, each first axis A1 may pass through the first cutting insert 20 in-between the two side surfaces 26a, 26b.

Further, in some embodiments of the present invention, the three tip portions 24a, 24b, 24c may be circumferentially spaced apart by three recessed joining portions 32a, 32b, 32c.

It should be appreciated that the three recessed joining portions 32a, 32b, 32c may be devoid of cutting edges.

Further, in some embodiments of the present invention, the two first cutting edges 30a, 30b of each tip portion 24a, 24b, 24c may be identical.

Yet further, in some embodiments of the present invention, each tip portion 24a, 24b, 24c may exhibit 2-fold (i.e., 180°) rotational symmetry about the respective first axis A1.

It should be appreciated that for embodiments of the present invention, in which each tip portion 24a, 24b, 24c has two identical radially extending first cutting edges 30a, 30b, the cutting extent of each tip portion 24a, 24b, 24c may be advantageously high.

As shown in FIGS. 1 to 3, each tip portion 24a, 24b, 24c may have two abutment surfaces 34a, 34b.

It should be appreciated that configuring each tip portion 24a, 24b, 24c to include two first cutting edges 30a, 30b and two abutment surfaces 34a, 34b, results in highly efficient use of the insert's size/volume.

In some embodiments of the present invention, the two abutment surfaces 34a, 34b of each tip portion 24a, 24b, 24c may be spaced apart from the two respective first cutting edges 30a, 30b by two respective clearance surfaces 36a, 36b.

Also, in some embodiments of the present invention, the two abutment surfaces 34a, 34b of each tip portion 24a, 24b, 24c may be spaced apart from one another.

It should be appreciated that embodiments of the present invention, in which the two abutment surfaces 34a, 34b of each tip portion 24a, 24b, 24c are spaced apart from the two respective first cutting edges 30a, 30b, have a reduced risk of inadvertent damage to the first cutting edges 30a, 30b when at least one of the two abutment surfaces 34a, 34b makes contact with a corresponding support surface of, for example, a tool body/shank.

In some embodiments of the present invention, the two abutment surfaces 34a, 34b of each tip portion 24a, 24b, 24c may intersect different first and second side surfaces 26a, 26b.

As shown in FIG. 2, in a side view of the first cutting insert 20, each of the three visible abutment surfaces 34b intersects the first side surface 26a at a side edge 35b. The three side edges 35b may define a first imaginary equilateral triangle T1. A second equilateral triangle (not shown) may be formed by the three side edges formed at the intersections of the three abutment surfaces 34a with the second side surface 26b.

Also, in some embodiments of the present invention, each abutment surface 34a, 34b may intersect one of the three recessed joining portions 32a, 32b, 32c.

Further, in some embodiments of the present invention, each abutment surface 34a, 34b may be planar.

As shown in FIGS. 1 to 3, each first axis A1 may intersect the respective tip portion 24a, 24b, 24c at a tip point NT.

In some embodiments of the present invention, the two first cutting edges 30a, 30b of each tip portion 24a, 24b, 24c may merge at the respective tip point NT.

Also, in some embodiments of the present invention, each first cutting edge 30a, 30b of each tip portion 24a, 24b, 24c may continuously extend from the respective tip point NT to the respective radially outermost cutting point NC1, NC2.

As shown in FIGS. 2 and 3, a tip plane PT perpendicular to the first axis A1 contains the two radially outermost cutting points NC1, NC2, and the two radially outermost cutting points NC1, NC2 lie on an imaginary first circle C1 having a center coincident with the first axis A1 and a first cutting diameter DC1. The tip plane PT contains the imaginary first circle C1.

As shown in FIG. 2, in a view taken along the central axis AC, each tip point NT may be located on one side of the respective tip plane PT, and the central axis AC may be located on the opposite of said tip plane PT.

In some embodiments of the present invention, no point along the two first cutting edges 30a, 30b of each tip portion 24a, 24b, 24c may be located further from the respective tip plane PT than the respective tip point NT.

As shown in FIG. 3, a median plane M perpendicular to the central axis AC contains the three first axes A1.

In some embodiments of the present invention, the two radially outermost cutting points NC1, NC2 of each tip portion 24a, 24b, 24c may be located on opposite sides of the median plane M.

Also, the median plane M passes in-between the two side surfaces 26a, 26b. In some embodiments of the present invention, the median plane M may be located mid-way between the first and second side surfaces 26a, 26b.

Figure 4:
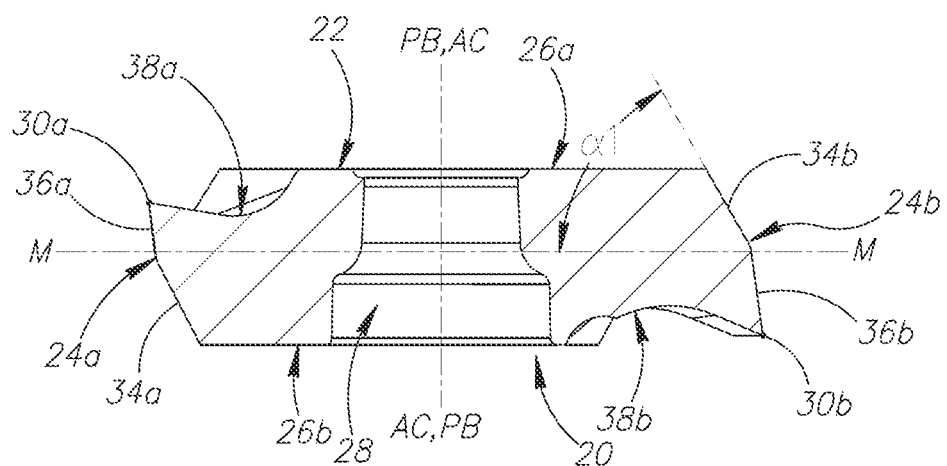
FIG. 4 is a cross-sectional view of the first cutting insert shown in FIG. 2, taken along the line IV-IV.

As shown in FIG. 4, each abutment surface 34a, 34b may form an acute internal first abutment angle $\alpha 1$ with the median plane M.

In some embodiments of the present invention, the first abutment angle $\alpha 1$ may be greater than fifty degrees and less than eighty degrees, i.e. $50°<\alpha 1<80°$.

Also, in some embodiments of the present invention, the two abutment surfaces 34a, 34b of each tip portion 24a, 24b, 24c may be entirely located on opposite sides of the median plane M.

As shown in FIG. 2, each tip portion 24a, 24b, 24c may be bisected by a bisector plane PB perpendicular to the median plane M and containing the central axis AC.

In some embodiments of the present invention, as shown in FIG. 2, in a side view of the first cutting insert 20, each abutment surface 34a, 34b may form an acute second abutment angle $\alpha 2$ with the respective bisector plane PB.

Also, in some embodiments of the present invention, the second abutment angle $\alpha 2$ may be greater than sixty degrees, i.e. $\alpha 2>60°$.

Further, in some embodiments of the present invention, the two abutment surfaces 34a, 34b of each tip portion 24a, 24b, 24c may be located on opposite sides of the respective bisector plane PB.

As shown in FIGS. 1 and 2, each of the first and second side surfaces 26a, 26b may have three circumferentially spaced apart cut-outs 38a, 38b, and each first cutting edge 30a, 30b of each tip portion 24a, 24b, 24c may have an adjacent rake surface 40a, 40b disposed in a corresponding one of the cut-outs 38a, 38b.

In some embodiments of the present invention, a radially inner portion of each rake surface 40a, 40b may be disposed on a web-thinning gash 42a, 42b of the corresponding cut-out 38a, 38b.

As shown in FIGS. 1 to 3, each web-thinning gash 42a, 42b may have a gash path GP defined by a plurality of gash apex points from a series of cross-sections taken in planes perpendicular to the respective first axis A1 and intersecting the web-thinning gash 42a, 42b.

In some embodiments of the present invention, each gash path GP may extend away from the median plane M as it extends away from the respective tip point NT.

Figure 5:
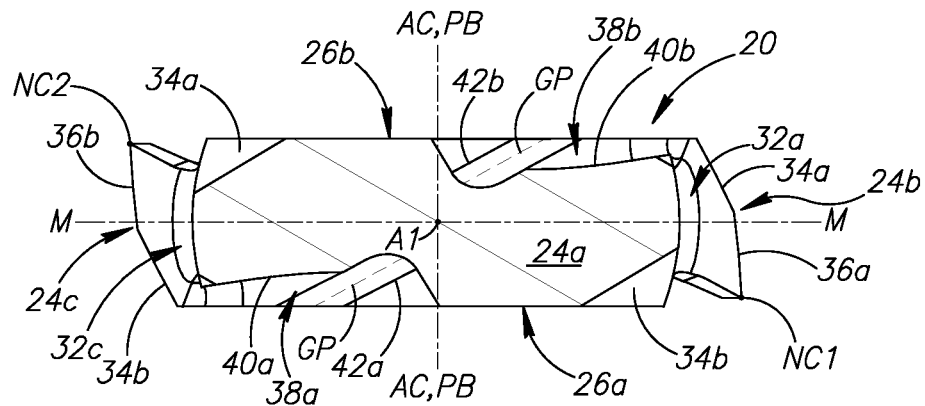
FIG. 5 is a cross-sectional view of the first cutting insert shown in FIG. 2, taken along the line V-V.

It should be appreciated throughout the description and claims, that for each cross-section taken in a plane perpendicular to any one of the first axes A1 and intersecting the respective web-thinning gash 42a, 42b, as shown, for example, in FIG. 5, an associated gash apex point is located at the midpoint of a segment of the associated profile having a minimum radius.

As shown in FIG. 3, in a view taken along any one of the three first axes A1, an imaginary second circle C2 having a second diameter D2 circumscribes the first cutting insert 20, i.e., the second circle C2 is the minimum-sized circle in which the entire insert fits, in that view.

In some embodiments of the present invention, the imaginary second circle C2 may have a center coincident with the respective first axis A1. In such case, the second circle C2 is concentric with the corresponding first circle C1.

According to the present invention, the first cutting diameter DC1 is at least sixty percent of the second diameter D2, i.e. $DC1 \geq D2*0.60$.

By virtue of the first cutting diameter DC1 being at least sixty percent of the second diameter D2 for each tip portion 24a, 24b, 24c, the cutting extent of the first cutting insert 20 relative its size/volume is advantageously high, resulting in highly efficient use of the cemented carbide, from which the first cutting insert 20 is typically manufactured.

In some embodiments of the present invention, the first cutting diameter DC1 may be at least seventy percent of the second diameter D2, i.e. $DC1 \geq D2*0.70$.

Also, in some embodiments of the present invention, the first cutting diameter DC1 may be at most ninety percent of the second diameter D2, i.e. $DC1 \leq D2*0.90$.

Further, in some embodiments of the present invention, as shown in FIG. 3, in a view taken along any one of the three first axes A1, one of the two radially outermost cutting points NC1, NC2 of each of the two non-associated tip portions 24a, 24b, 24c may lie on the imaginary second circle C2, whereby the said two non-associated tip portions 24a, 24b, 24c are the two tip portions 24a, 24b, 24c not associated with the first axis A1 along which the said view is taken.

As shown in FIG. 3, the first and second side surfaces 26a, 26b define first and second side planes P1, P2, and the first and second side planes P1, P2 define a maximum insert thickness TI in a direction along to the central axis AC.

In some embodiments of the present invention, no portion of the first cutting insert 20 may extend outside the maximum insert thickness TI, i.e., extend beyond the first or second side plane P1, P2 in respective directions away from the median plane M.

Also, in some embodiments of the present invention, the first and second side planes P1, P2 may be parallel to the median plane M.

Further, in some embodiments of the present invention, the first cutting diameter DC1 may be at least twice the maximum insert thickness TI, i.e. $DC1 \geq TI*2$.

It should be appreciated that for embodiments of the present invention, in which the first cutting diameter DC1 is at least twice the maximum insert thickness TI, the cutting extent of the first cutting insert 20 relative its size or volume is advantageously high, resulting in highly efficient use of the cemented carbide, from which the first cutting insert 20 is typically manufactured.

As shown in FIG. 3, the two radially outermost cutting points NC1, NC2 of each tip portion 24a, 24b, 24c may be located between the first and second side planes P1, P2, and thus each of the two radially outermost cutting points NC1, NC2 may not be contained in either of the first and second side planes P1, P2.

In some embodiments of the present invention, the two first cutting edges 30a, 30b of each tip portion 24a, 24b, 24c may be entirely located between the first and second side planes P1, P2.

It should be appreciated that for embodiments of the present invention, in which the two first cutting edges 30a, 30b of each tip portion 24a, 24b, 24c are entirely located between the first and second side planes P1, P2, during assembly of the first cutting insert 20 to a cutting tool, and during cutting operations, the first cutting edges 30a, 30b associated with non-operative tip portions 24a, 24b, 24c, may be better protected from inadvertent contact/damage.

As shown in FIG. 3, each imaginary first circle C1 intersects the median plane M at two intersection points NI1, NI2.

Figure 6:
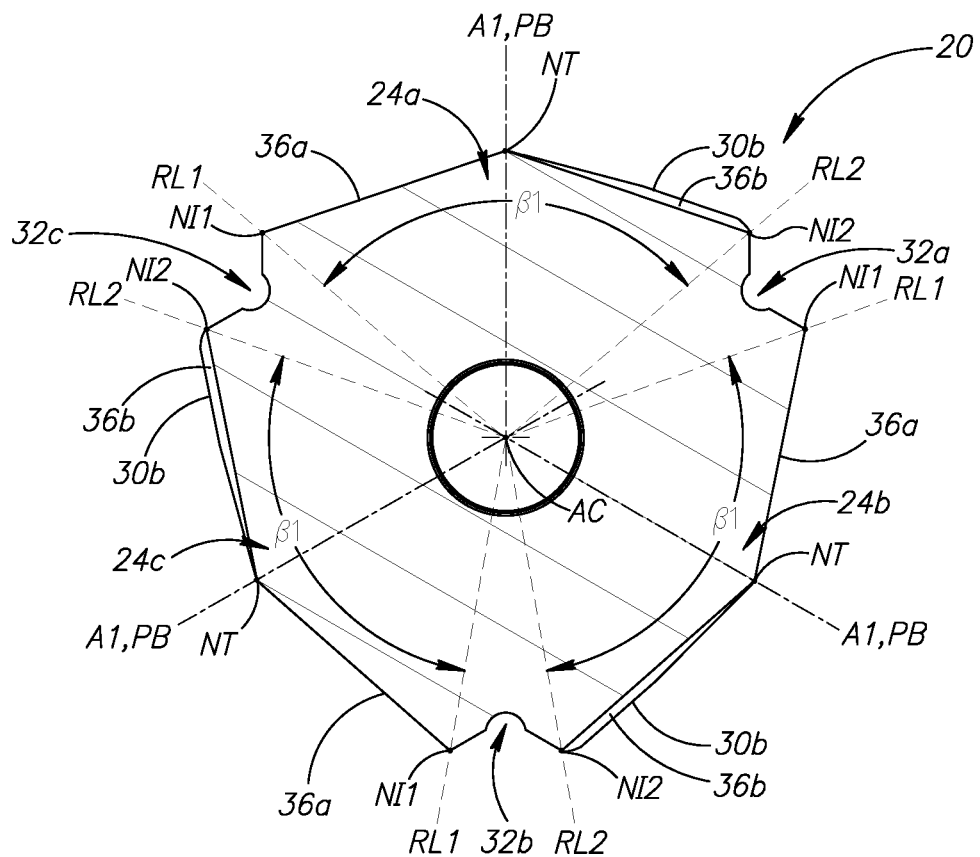
FIG. 6 is a cross-sectional view of the first cutting insert shown in FIG. 3, taken along the line VI-VI.

As shown in FIG. 6, in a cross-section taken in the median plane M, each intersection point NI1, NI2 lies on an imaginary radial straight line RL1, RL2 containing the central axis AC, and the two imaginary radial straight lines RL1, RL2 associated with each imaginary first circle C1 form a first cutting angle β1.

In some embodiments of the present invention, the first cutting angle θ1 may be greater than seventy degrees, i.e. β1>70°.

Also, in some embodiments of the present invention, the first cutting angle θ1 may be greater than ninety degrees, i.e. β1>90°.

As shown in FIGS. 7 to 12, another aspect of the present invention relates to a rotary cutting tool 44 rotatable about a tool axis AT in a direction of rotation DR, having a tool cutting diameter DCT.

The rotary cutting tool 44 includes a tool shank 46 and a plurality of cutting inserts 20, 120, 220, the tool shank 46 extending along the tool axis AT and having a plurality of insert receiving pockets 48, 148, 248 at forward end 50 thereof, and the plurality of cutting inserts 20, 120, 220 removably secured in the plurality of insert receiving pockets 48, 148, 248.

In some embodiments of the present invention, the rotary cutting tool 44 may be a drilling tool.

Also, in some embodiments of the present invention, the tool shank 46 may have two flute portions 52a, 52b circumferentially alternating with first and second land portions 54, 56.

Further, in some embodiments of the present invention, the two flute portions 52a, 52b may helically extend from the shank's forward end 50 along the tool axis AT.

As shown in FIGS. 7 to 10, the plurality of cutting inserts 20, 120, 220 include one of the aforementioned first cutting inserts 20, and a second cutting insert 120 having at least one second cutting edge 130a, 130b, 130c, 130d. The second cutting insert 120 differs in construction from the first cutting insert 20. The plurality of cutting inserts may also include a third cutting insert 220 having at least one third cutting edge 230a, 230b, 230c, 230d. The third cutting insert 220 may be identical to the second cutting insert 120. While these figures show a rotary cutting tool 44 having both a second cutting insert 120 and a third cutting insert 220, in other embodiments, only the second cutting insert 120 may be provided.

Figure 7:
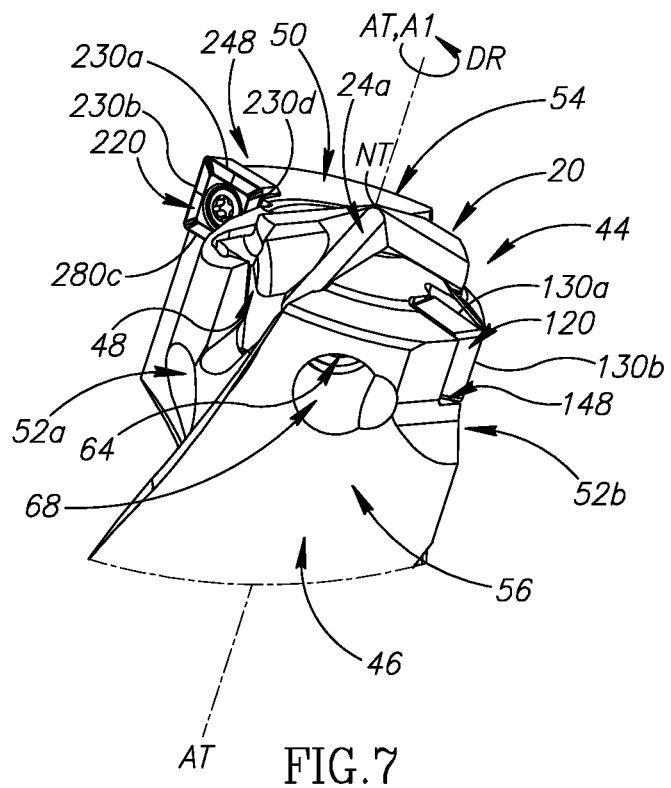
FIG. 7 is a perspective view of a rotary cutting tool in accordance with the present invention.
Figure 8:
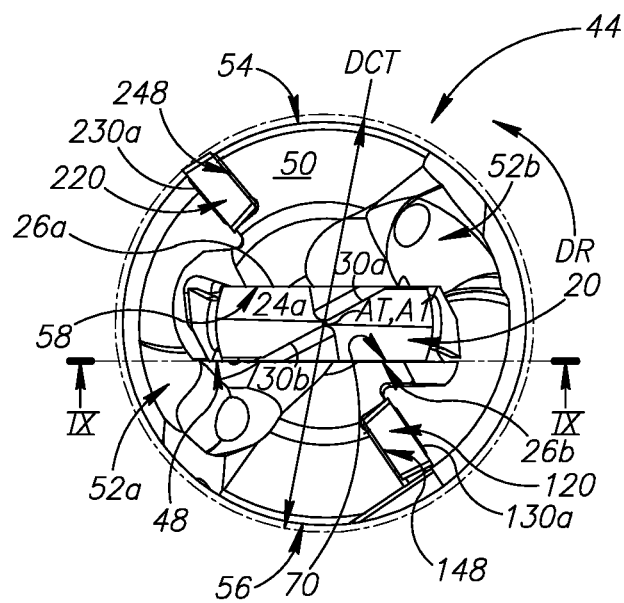
FIG. 8 is an end view of the rotary cutting tool shown in FIG. 7.
Figure 9:
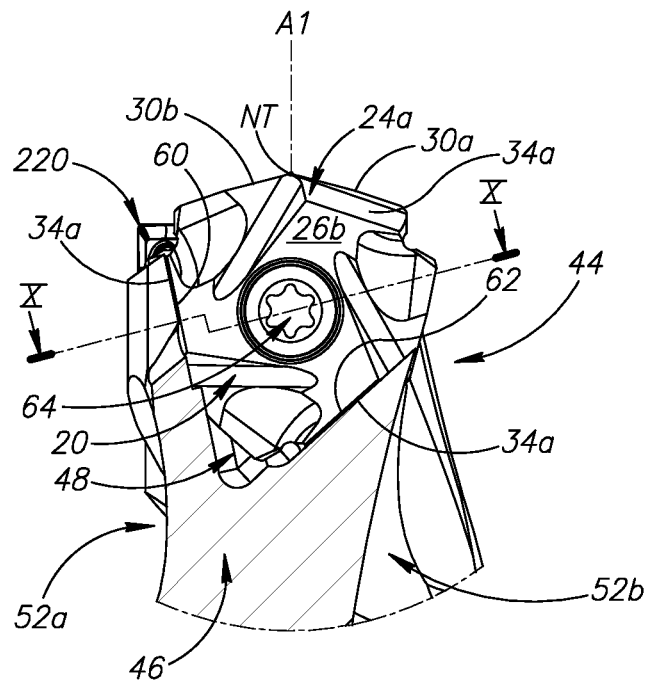
FIG. 9 is a cross-sectional view of the rotary cutting tool shown in FIG. 8, taken along the line IX-IX.

As shown in FIGS. 7 to 9, one of the tip portions 24a, 24b, 24c is operative, having its first axis A1 coaxial to the tool axis AT, and one of the second cutting edges 130a, 130b, 130c, 130d is operative and extends radially outward of the first cutting diameter DC1, relative to the tool axis AT. Also, one of the third cutting edges 230a, 230b, 230c, 230d is operative and extends radially outward of the first cutting diameter DC1, relative to the tool axis AT. In the embodiment shown, the operative third cutting edge 230a, 230b, 230c, 230d radially overlaps the operative second cutting edge 130a, 130b, 130c, 130d. Also, in the embodiment shown, the operative cutting edges of the first, second and third cutting inserts 20, 120, 220 together establish the tool cutting diameter DCT.

By virtue of the operative tip portion's first axis A1 being coaxial to the tool axis AT, the first cutting insert 20 may be described as centrally mounted.

In some embodiments of the present invention, the tool cutting diameter DCT may be greater than the first cutting diameter DC1.

By virtue of the first cutting diameter DC1 being at least sixty percent of the second diameter D2 for each tip portion 24a, 24b, 24c, if desired, the operative tip portion 24a, 24b, 24c and its two radially extending first cutting edges 30a, 30b may advantageously contribute to more than fifty percent of the tool cutting diameter DCT.

As shown in FIGS. 7 to 12, the plurality of insert receiving pockets 48, 148, 248 may include a first insert receiving pocket 48 having a seat surface 58 and spaced apart first and second support walls 60, 62 transverse to the seat surface 58.

In some embodiments of the present invention, the two flute portions 52a, 52b may communicate with the first insert receiving pocket 48.

Also, in some embodiments of the present invention, the first and second support walls 60, 62 may be planar, and the seat surface 58 may be planar.

Further, in some embodiments of the present invention, at least one of the first and second support walls 60, 62 may form an acute external first support angle δ1 with the seat surface 58.

Yet further, in some embodiments of the present invention, the first support angle δ1 may be equal to the first abutment angle α1.

In an assembled position of the rotary cutting tool 44, as shown in FIGS. 7 to 10;

one of the first and second side surfaces 26a, 26b of the first cutting insert 20 may be in contact with the seat surface 58, and one of the two abutment surfaces 34a, 34b of each of the two non-operative tip portions 24a, 24b, 24c of the first cutting insert 20 may be in contact with a corresponding one of the first and second support walls 60, 62.

It should be appreciated that configuring at least one of the first and second support walls 60, 62 to form an acute external first support angle δ1 with the seat surface 58, results in cutting forces acting on the first and/or second support wall 60, 62 being partially directed towards the seat surface 58, and thus a stable clamping arrangement of the cutting insert 20 in the first insert receiving pocket 48.

It should also be appreciated that for embodiments of the present invention, in which the two abutment surfaces 34a, 34b of each tip portion 24a, 24b, 24c are spaced apart from the two respective first cutting edges 30a, 30b, results in a reduced risk of inadvertent damage to the first cutting edges 30a, 30b of the two non-operative tip portions 24a, 24b, 24c when one of the two abutment surfaces 34a, 34b of each of the two non-operative tip portions 24a, 24b, 24c are in contact with the first and second support walls 60, 62.

In some embodiments of the present invention, a clamping screw 64 may pass through the through bore 28 and threadingly engage a threaded bore 66 in the seat surface 58.

Also, in some embodiments of the present invention, the seat surface 58 may be formed on the first land portion 54.

Further, in some embodiments of the present invention, a through aperture 68 may be formed on the second land portion 56.

It should be appreciated that for embodiments of the present invention, in which a through aperture 68 is formed on the second land portion 56, access may be provided for an operator to pass the clamping screw 64 through the through bore 28 via the through aperture 68, and also tighten/untighten the clamping screw 64 with a torque wrench via the through aperture 68.

Figure 11:
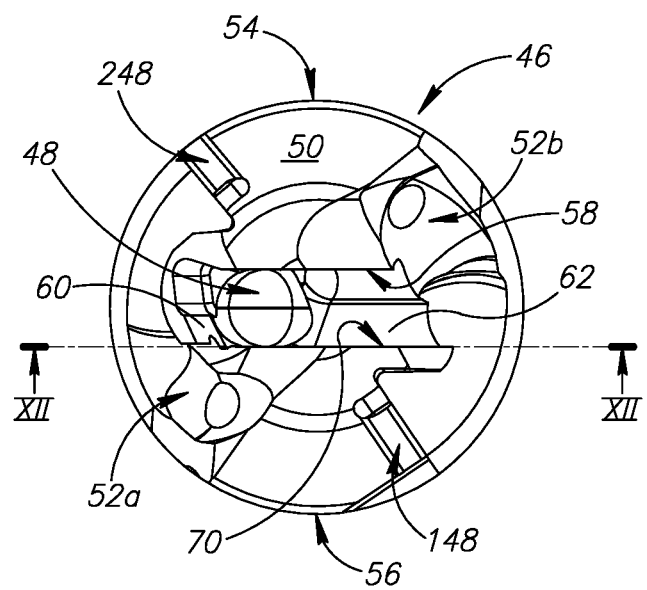
FIG. 11 is an end view of a tool shank in accordance with the present invention.

As shown in FIG. 11, the second land portion 56 may include an inner wall 70 facing the seat surface 58 of the first land portion 54.

Figure 10:
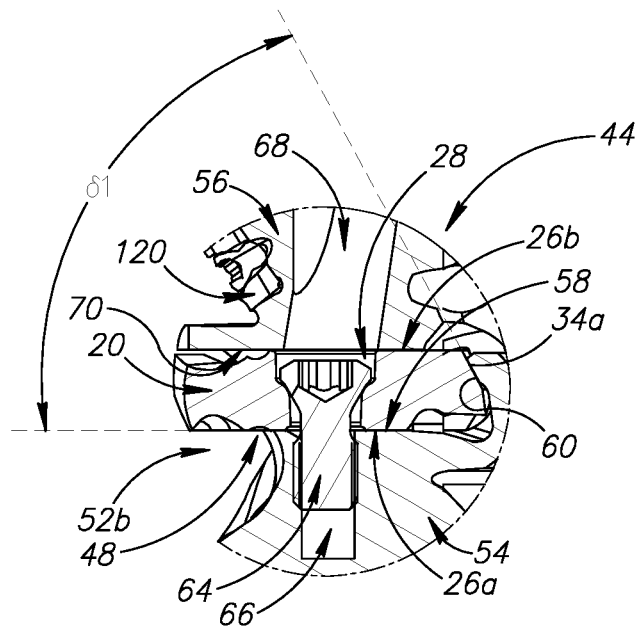
FIG. 10 is a cross-sectional view of the rotary cutting tool shown in FIG. 9, taken along the line X-X.

In an assembled position of the rotary cutting tool 44, as shown in FIGS. 8 and 10, the one of the first and second side surfaces 26a, 26b not in contact with the seat surface 58 may be spaced apart from the inner wall 70.

In some embodiments of the present invention, apart from one of the first and second side surfaces 26a, 26b being in contact with the seat surface 58, and one of the two abutment surfaces 34a, 34b of each of the two non-operative tip portions 24a, 24b, 24c being in contact with the first and second support walls 60, 62, respectively, no other surfaces of the first cutting insert 20 may be in contact with any other surface of the first insert receiving pocket 48.

Figure 12:
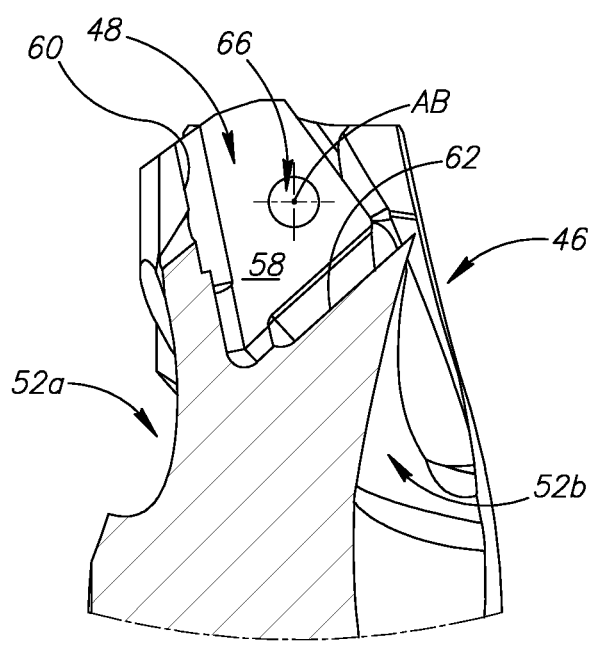
FIG. 12 is a cross-sectional view of the tool shank shown in FIG. 11, taken along the line XII-XII.

As shown in FIG. 12, the threaded bore 66 has a bore axis AB.

In some embodiments of the present invention, in each index position of the first cutting insert 20, the central axis AC may be non-coaxial with the bore axis AB, and the threaded bore 66 may be eccentric in relation to the through bore 28, so that, when the clamping screw 64 is tightened, good contact is made between the two abutment surfaces 34a, 34b of the two non-operative tip portions 24a, 24b, 24c and the first and second support walls 60, 62.

It should also be appreciated that in some embodiments of the present invention, the first and second support walls 60, 62 may be disposed on different structural portions of the first insert receiving pocket 48 resiliently displaceable with respect to each other, thus enabling the first and second support walls 60, 62 to fully correspond with the two abutment surfaces 34a, 34b of the two non-operative tip portions 24a, 24b, 24c when the clamping screw 64 is tightened.

As shown in FIGS. 7, 8 and 11, the plurality of insert receiving pockets 48, 148, 248 may include a second insert receiving pocket 148 formed on one of the two land portions 54, 56, and the second cutting insert 120 may be removably secured in the second insert receiving pocket 148.

As shown in FIGS. 7, 8 and 11, the plurality of insert receiving pockets 48, 148, 248 may include a third insert receiving pocket 248 formed on the one of the two land portions 54, 56 not having the second insert receiving pocket 148, and the third cutting insert 220 may be removably secured in the third insert receiving pocket 248.

Although the present invention has been described to a certain degree of particularity, it should be understood that various alterations and modifications could be made without departing from the spirit or scope of the invention as hereinafter claimed.

What is claimed is:

1. An indexable drilling insert (20) comprising:
   a central portion (22) and three tip portions (24a, 24b, 24c),
      the central portion (22) having opposing first and second side surfaces (26a, 26b) and a central axis (AC) passing through the first and second side surfaces (26a, 26b),
      a median plane (M) perpendicular to the central axis (AC), and passing in-between the two side surfaces (26a, 26b);
      the three tip portions (24a, 24b, 24c) circumferentially spaced about the central portion (22), each tip portion (24a, 24b, 24c) having:
         a first axis (A1) and two diverging first cutting edges (30a, 30b),
         the first axis (A1) intersecting the tip portion (24a, 24b, 24c) at a tip point (NT),
         the two first cutting edges (30a, 30b) merging at the tip point (NT) and extending away from the first axis (A1) to two radially outermost cutting points (NC1, NC2) with respect to the first axis (A1),
         a tip plane (PT) perpendicular to the first axis (A1) and containing the two radially outermost cutting points (NC1, NC2), and
         the two radially outermost cutting points (NC1, NC2) lying on an imaginary first circle (C1) having a center coincident with the first axis (A1), and a first cutting diameter (DC1),
   wherein:
   the median plane (M) contains the three first axes (A1),
   the three tip portions (24a, 24b, 24c) are circumferentially spaced apart by three recessed joining portions (32a, 32b, 32c) devoid of cutting edges,
   in a view taken along any one of the three first axes (A1), an imaginary second circle (C2) concentric with the first circle (C1) and having a second diameter (D2) circumscribes the drilling insert (20), and
   the first cutting diameter (DC1) is at least sixty percent of the second diameter (D2).

2. The drilling insert (20) according to claim 1, wherein no point along the two first cutting edges (30a, 30b) of each tip portion (24a, 24b, 24c) is located further from the respective tip plane (PT) than the respective tip point (NT).

3. The drilling insert (20) according to claim 1, wherein each first axis (A1) intersects the central axis (AC).

4. The drilling insert (20) according to claim 1, wherein the two radially outermost cutting points (NC1, NC2) of each tip portion (24a, 24b, 24c) are located on opposite sides of the median plane (M).

5. The drilling insert (20) according to claim 1, wherein the median plane (M) is located mid-way between the first and second side surfaces (26a, 26b).

6. The drilling insert (20) according to claim 1, wherein:
   the first and second side surfaces (26a, 26b) define first and second side planes (P1, P2),
   the first and second side planes (P1, P2) define a maximum insert thickness (TI) in a direction along the central axis (AC), and
   no portion of the drilling insert (20) extends outside the maximum insert thickness (TI).

7. The drilling insert (20) according to claim 6, wherein the first cutting diameter (DC1) is at least twice the maximum insert thickness (TI).

8. The drilling insert (20) according to claim 6, wherein the two radially outermost cutting points (NC1, NC2) of each tip portion (24a, 24b, 24c) are located between the first and second side planes (P1, P2).

9. The drilling insert (20) according to claim 1, wherein:
   each imaginary first circle (C1) intersects the median plane (M) at two intersection points (NI1, NI2),
   in a cross-section taken in the median plane (M), each intersection point (NI1, NI2) lies on an imaginary radial straight line (RL1, RL2) containing the central axis (AC), and
   the two imaginary radial straight lines (RL1, RL2) associated with each imaginary first circle (C1) form a first cutting angle (β1) greater than seventy degrees.

10. The drilling insert (20) according to claim 1, wherein in a view taken along any one of the three first axes (A1):
    one of the two radially outermost cutting points (NC1, NC2) of each of the two non-associated tip portions (24a, 24b, 24c) lies on the imaginary second circle (C2).

11. The drilling insert (20) according to claim 1, wherein each tip portion (24a, 24b, 24c) has two abutment surfaces (34a, 34b).

12. The drilling insert (20) according to claim 11, wherein the two abutment surfaces (34a, 34b) of each tip portion (24a, 24b, 24c) intersect different first and second side surfaces (26a, 26b).

13. The drilling insert (20) according to claim 11, wherein the two abutment surfaces (34a, 34b) of each tip portion (24a, 24b, 24c) are spaced apart from the two respective first cutting edges (30a, 30b) by two respective clearance surfaces (36a, 36b).

14. The drilling insert (20) according to claim 11, wherein each abutment surface (34a, 34b) forms an acute internal first abutment angle (α1) with the median plane (M).

15. The drilling insert (20) according to claim 1, wherein the first cutting diameter (DC1) is at least seventy percent of the second diameter (D2).

16. The drilling insert (20) according to claim 1, wherein:
    each of the first and second side surfaces (26a, 26b) has three circumferentially spaced apart cut-outs (38a, 38b), and
    each first cutting edge (30a, 30b) of each tip portion (24a, 24b, 24c) has an adjacent rake surface (40a, 40b) disposed in a corresponding one of the cut-outs (38a, 38b).

17. The drilling insert (20) according to claim 16, wherein a radially inner portion of each rake surface (40a, 40b) is disposed on a web-thinning gash (42a, 42b) of the corresponding cut-out (38a, 38b).

18. The drilling insert (20) according to claim 1, wherein each tip portion (24a, 24b, 24c) exhibits 2-fold rotational symmetry about the respective first axis (A1).

19. The drilling insert (20) according to claim 1, wherein the first cutting diameter (DC1) is at most ninety percent of the second diameter (D2).

20. A rotary cutting tool (44) rotatable about a tool axis (AT) in a direction of rotation (DR) and having a tool cutting diameter (DCT), comprising:
    a tool shank (46) extending along the tool axis (AT) and having a plurality of insert receiving pockets (48, 148, 248) at forward end (50) thereof, and
    a plurality of cutting inserts (20, 120, 220) removably secured in the plurality of insert receiving pockets (48, 148, 248), including:
       an indexable drilling insert (20) comprising:
          a central portion (22) and three tip portions (24a, 24b, 24c),
          the central portion (22) having opposing first and second side surfaces (26a, 26b) and a central axis (AC) passing through the first and second side surfaces (26a, 26b),
          a median plane (M) perpendicular to the central axis (AC), and passing in-between the two side surfaces (26a, 26b),
          the three tip portions (24a, 24b, 24c) circumferentially spaced about the central portion (22), each tip portion (24a, 24b, 24c) having:
             a first axis (A1) and two diverging first cutting edges (30a, 30b),
             the first axis (A1) intersecting the tip portion (24a, 24b, 24c) at a tip point (NT),
             the two first cutting edges (30a, 30b) extending away from the first axis (A1) to two radially outermost cutting points (NC1, NC2) with respect to the first axis (A1),
             a tip plane (PT) perpendicular to the first axis (A1) and containing the two radially outermost cutting points (NC1, NC2), and
             the two radially outermost cutting points (NC1, NC2) lying on an imaginary first circle (C1) having a center coincident with the first axis (A1), and a first cutting diameter (DC1),
          wherein:
             the median plane (M) contains the three first axes (A1),
             in a view taken along any one of the three first axes (A1), an imaginary second circle (C2) concentric with the first circle (C1) and having a second diameter (D2) circumscribes the drilling insert (20), and
             the first cutting diameter (DC1) is at least sixty percent of the second diameter (D2); and
       a second cutting insert (120) differing in construction from the drilling insert (20), and having at least one second cutting edge (130a, 130b, 130c, 130d),
       wherein:
    one of the tip portions (24a, 24b, 24c) of the drilling insert (20) is operative and has its first axis (A1) coaxial to the tool axis (AT), and
    one of the second cutting edges (130a, 130b, 130c, 130d) of the second cutting insert (120) is operative and extends radially outward of the first cutting diameter (DC1), relative to the tool axis (AT).

21. The rotary cutting tool (44) according to claim 20, wherein the tool cutting diameter (DCT) is greater than the first cutting diameter (DC1).

22. The rotary cutting tool (44) according to claim 20, wherein:
    each tip portion (24a, 24b, 24c) of the drilling insert (20) has two abutment surfaces (34a, 34b),
    the plurality of insert receiving pockets (48, 148, 248) include a first insert receiving pocket (48) having a seat surface (58) and spaced apart first and second support walls (60, 62) transverse to the seat surface (58),
    one of the first and second side surfaces (26a, 26b) of the drilling insert (20) is in contact with the seat surface (58), and
    one of the two abutment surfaces (34a, 34b) of each of the two non-operative tip portions (24a, 24b, 24c) of the drilling insert (20) is in contact with a corresponding one of the first and second support walls (60, 62).

23. The rotary cutting tool (44) according to claim 22, wherein:

a through bore (28) intersects the first and second side surfaces (26*a*, 26*b*), and a clamping screw (64) passes through the through bore (28) and threadingly engages a threaded bore (66) in the seat surface (58).

24. The rotary cutting tool (44) according to claim 22, wherein:

the tool shank (46) has two flute portions (52*a*, 52*b*) circumferentially alternating with first and second land portions (54, 56), and the seat surface (58) is formed on the first land portion (54).

25. The rotary cutting tool (44) according to claim 20, wherein:

the plurality of cutting inserts (20, 120, 220) further includes a third cutting insert (220) identical to the second cutting insert (120), the third cutting insert (220) having at least one third edge (230*a*, 230*b*, 230*c*, 230*d*);

one of the third edges (230*a*, 230*b*, 230*c*, 230*d*) of the third cutting insert (220) is operative and extends radially outward of the first cutting diameter (DC1), relative to the tool axis (AT); and the operative cutting edges of the drilling insert (20) and the second and third cutting inserts (120, 220) together establish the tool cutting diameter (DCT).

* * * * *